Figure 1:
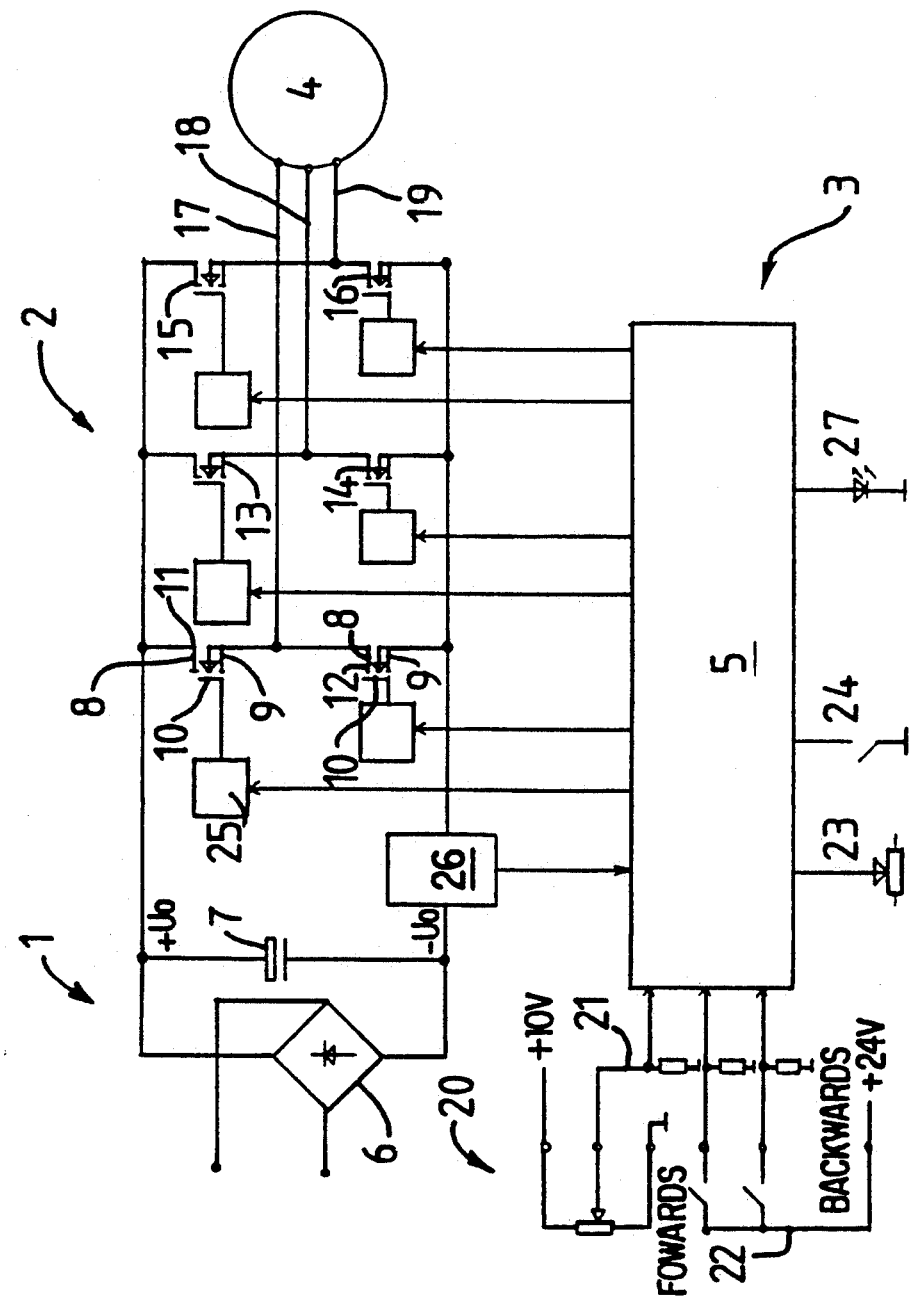

United States Patent [19]
Schmidhauser

[11] Patent Number: 5,307,258
[45] Date of Patent: Apr. 26, 1994

[54] PROCESS FOR CONVERTING A FIRST AC SIGNAL INTO A SECOND AC SIGNAL AND A CONVERTER FOR PERFORMING THE PROCESS

[76] Inventor: Rolf Schmidhauser, Bahnhofstrasse 10, Egnach, Switzerland, CH-9322

[21] Appl. No.: 726,128

[22] Filed: Jul. 3, 1991

Related U.S. Application Data

[63] Continuation of Ser. No. 528,907, May 29, 1990, abandoned, which is a continuation of Ser. No. 408,952, Sep. 18, 1989, abandoned, which is a continuation of Ser. No. 159,576, Mar. 17, 1988, abandoned.

[30] Foreign Application Priority Data

Jun. 3, 1986 [CH] Switzerland .................. 2240/86

[51] Int. Cl.$^5$ .......................................... H02M 7/5387
[52] U.S. Cl. .................................... 363/98; 363/41; 363/132; 318/811
[58] Field of Search ........................... 363/37–41, 363/98, 132, 97, 131; 318/798–812

[56] References Cited

U.S. PATENT DOCUMENTS

| | | | |
|---|---|---|---|
| 4,615,000 | 9/1986 | Fujii et al. | 363/41 |
| 4,622,628 | 11/1986 | Murasaki et al. | 363/37 |
| 4,656,572 | 4/1987 | Caputo et al. | 363/41 |
| 4,729,087 | 3/1988 | Trümpler et al. | 363/37 X |
| 4,788,485 | 11/1988 | Kawagishi et al. | 363/37 X |

*Primary Examiner*—Emanuel T. Voeltz
*Attorney, Agent, or Firm*—Wegner, Cantor, Mueller & Player

[57] ABSTRACT

The conversion of a first AC signal into a second AC signal (32) is performed from a first AC signal, from data and from measurement values obtained during conversion. During conversion, switches obtained during conversion. During conversion, Switches are activated with the aid of a computer, which, on the basis of data and measurement values, calculates the necessary frequency and amplitude of the second AC signal (32) at time intervals (A). Control sequences (Q1, Q2, Q3, etc. . . ) are applied to the switches, the latter controlling said sequences during the above-mentioned time intervals (A), in order to produce the second AC signal (32). An output signal of any desired frequency and amplitude shape can thus be obtained, and can also be modified during operation of the transformer.

19 Claims, 2 Drawing Sheets

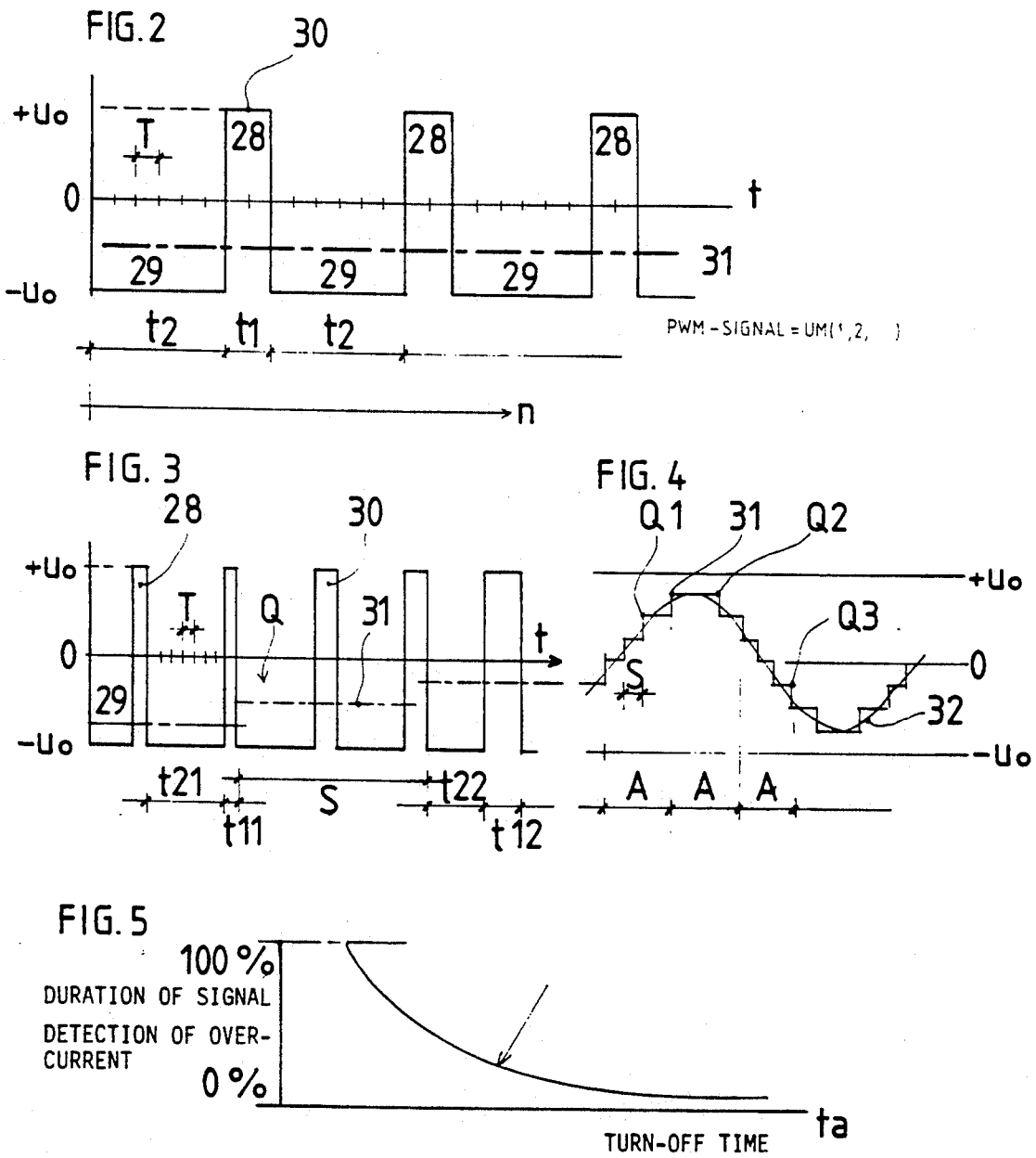

PROCESS FOR CONVERTING A FIRST AC SIGNAL INTO A SECOND AC SIGNAL AND A CONVERTER FOR PERFORMING THE PROCESS

This application is a continuation of U.S. application Ser. No. 07/528,907, filed May 29, 1990, now abandoned, which is a continuation of U.S. application Ser. No. 07/408,952 filed Sep. 18, 1989, which is a continuation of Ser. No. 07/159,576 filed Mar. 17, 1988, now abandoned.

The present invention relates to a process for converting a first alternating-current signal into a second alternating-current signal in which, starting from the first alternating-current signal, switches are activated taking into consideration preset values and measurement values determined during the conversion, and a converter for performing this process.

It is known to convert a first alternating-current signal into a second alternating-current signal by controlling switches in a suitable manner. This conversion is performed by converters in which the ratio between the frequency of the first alternating-current signal and the frequency of the second alternating-current signal is given by the design of the converter.

However, there are cases in which the converter should be capable of changing the output frequency, that is to say the frequency of the second alternating-current signal and, if necessary, also its amplitude. One of these cases is represented by the feeding of asynchronous motors.

The present invention has the object of eliminating the above defect of the prior art.

In the text which follows, illustrative embodiments of the present invention are explained in greater detail with reference to the attached drawings, in which:

FIG. 1 shows a block diagram of the converter which is used for performing the present process, FIG. 2 shows the principle of achieving a signal having a desired amplitude which is constant, FIG. 3 shows the principle of achieving a signal having an amplitude which is variable, FIG. 4 shows the principle of achieving a signal having a periodically variable amplitude and FIG. 5 shows the behavior of the converter when it is overloaded.

The converter shown in FIG. 1 includes a rectifier 1 and an inverter 2, the inverter 2 being connected to the output of the rectifies 1. The converter furthermore includes a control device 3 which controls the mode of operation of the inverter 2 as determined by fixed and adjustable preset values and by instantaneous values or measurement values determined during the operation of the converter. A load 4 which, in the present case, is an asynchronous motor, is connected to the output of the inverter 2.

In the example shown, the converter is fed from a single-phase power system via a rectifier bridge 6. At the output terminals of this rectifier bridge 6, a direct voltage is available, the positive pole $+U_o$ being located at the output terminal of the bridge 6 drawn at the top and the negative pole $-U_o$ of the direct voltage being located at the output terminal drawn at the bottom. The output terminals $+U_o$ and $-U_o$ of the rectifier bridge 6 are also connected to, among other things, a smoothing capacitor 7.

The inverter 2 which, in the present case, is designed for supplying a three-phase alternating current signal, contains for each phase of the output signal a pair of switches 11, 12; 13, 14; and 15, 16; the switches of the respective pair being connected in series. MOSFETs are used as switches. Since it is intended to achieve a three-phase alternating current signal in the example shown, the inverter 2 contains three pairs of switches 11 and 12, 13 and 14 and 15 and 16 and the ends of these serial combinations of switches 11 to 16 are connected to the output terminals $+U_o$ and $-U_o$ of the rectifier bridge 6. The respective output conductor 17, 18 and 19 of the inverter 2 is connected between the switches of the corresponding switch pair 11, 12; 13, 14; 15, 16.

The control unit 3 contains a computer 5 which receives and processes the signals which are used for the generation of the second alternating-current signal and from these signals forms signals for controlling the inverter 2.

The switches 11 to 16 shown are n-channel MOSFETs. The drain electrode 8 of the first transistor 11 is connected to the positive terminal $+U_o$ of the rectifier bridge 6. The source electrode 9 of this switch 11 is connected to the drain electrode 8 of the second transistor 12 which is connected in series with this first switch 11, the output conductor 17 of this switch pair 11, 12 also being connected here. The source electrode 9 of the second switch 12 is connected to the negative terminal $-U_o$ of the rectifier bridge 6. The gate electrodes 10 of these switches 11 and 12 are connected via gate driver units 25 to the respective output of the computer 5. The remaining switch pairs 13 and 14 and 15 and 16, respectively, are also correspondingly joined to one another and connected to the computer 5. The remaining output conductors 18 and 19, respectively are connected at the junction between transistors of these further switch pairs.

In the example shown, means 20 for setting the frequency of the output signal, means 21 for setting the amplitude of the output signal, means 22 for setting the direction of rotation of the motor 4, means 23 for program selection and for selecting settings and means 24 for selecting options are connected to the inputs of the computer 5. Monitoring signals, for example in the case of overloading of the converter, pass from a monitoring unit 26 in the inverter circuit 2 to other inputs of the computer 5. An output at the computer 5 via which the closing and opening of the switches 11 to 16 is controlled exists as gate driver unit 25 of the switches 11 to 16. Means 27 for the visual display of the values set and/or measured are connected to at least one further output of the computer 5.

During the operation of this converter, the single-phase or multi-phase alternating voltage is converted by the rectifier bridge 6 into a direct voltage which is available at terminals $+U_o$ and $-U_o$. Depending on how the switches 11 to 16 are actuated by the computer 5, current is allowed to pass through one of these switches of the respective switch pair into the output conductors 17 to 19 which results in signals having the corresponding polarity in the output conductors 17 to 19 and thus also in an alternating voltage at the output of the inverter 2.

FIG. 2 shows the principle of how a signal 31 having a constant amplitude is generated with the aid of this converter on one of the conductors 17 to 19. In describing this principle, only the first switch pair 11 and 12, to which the output conductor 17 is connected, will be observed. This is because the operation of the other switch pairs is virtually the same apart from a corresponding phase shift.

Along the horizontal axis in FIG. 2, time intervals are plotted. The present converter operates at a basic interval which is designated by T and which is, for example, 10 microseconds. The shortest possible duration of the basic interval T is given by the clock frequency of the computer 5. Along the vertical axis, values of the direct voltage +Uo and −Uo supplied by the rectifier bridge 6 are plotted.

Using this converter, discrete amplitude steps of the second signal 31 of between +Uo and −Uo can be achieved. For this purpose, the first switch 11 is connected to the positive terminal +Uo and the second switch 12 is connected to the negative terminal −Uo of the bridge 6. When the first switch 11 is conducting and the second switch 12 is open, a positive DC voltage appears on the output conductor 17, namely during a period of time t1 which is given by the duration of the opening of the switch 11. When conversely the second switch 12 is conducting, a negative voltage appears on the output conductor 17 during a period of time t2. The voltages limited in time in this manner can be considered to be pulses, 28 designating a positive pulse and 29 designating a negative pulse. Thus, one switch pair, for example the pair 11 and 12, generates a pulse pair 28, 29 of opposite polarity.

The lower section of FIG. 2 contains a scale on which the lengths t1 and t2 or widths of the pulses 28 and 29 are drawn. The letter n here designates the number of repetitions of the pulse pairs 28, 29 having the duration of t1 and t2, respectively, which have appeared during the energy transmission between the feeding power system and the load 4. The length or width t1, t2 of the pulses 28, 29 used during the conversion is an integral multiple of the basic interval T.

FIG. 2 shows that firstly the second switch 12 was closed by the computer 5 and that this switch 12 remained closed during a period of time t2 so that a negative pulse 29 was produced the length of which was six basic intervals T. Thus, the voltage with negative polarity, which reached this conductor 17 via the second switch 12, first appeared on the output conductor 17. After the period of time t2 had elapsed, the second switch 12 was opened and the first switch 11 was closed. This remained closed during a period of time t1 which was two basic intervals T. After that, this first switch 11 is opened and the second switch 12 is closed again for a period of time t2 of six basic intervals, and so forth. The variation of the voltage on the conductor 17 is represented by the fully drawn line 30 in FIG. 2. This line 30 can also be considered as being the variation of the control voltage for the switches 11 and 12.

However, it is the mean value of the electrical energy fed to it which is decisive for the load 4 connected to the conductor 17. Because the "negative" energy was supplied during a total period of time of n times t2, which was longer than the total period of time n times t1 for supplying the "positive" energy, the mean value of the resultant signal 31 on the conductor 17 is negative from the point of view of the load 4. Since the ratio between t1 and t2 has not changed during the energy supply, the resultant signal 31 has a constant amplitude. The resultant signal of the inverter 2 is given by a dot-dashed horizontal line in FIG. 2 in order to indicate that the output signal 31 is a negative DC voltage of constant magnitude.

If the ratio between t1 and t2 is changed during the operation of the converter as is shown, for example, in FIG. 3, the mean value changes, that is to say, the amplitude of the output signal 31 changes. According to FIG. 3, the period of time t21 for the negative signal is initially approximately 7T and the period of time t11 for the positive signal is only 1T. The length of the period of time t1, that is to say, the width of the positive pulse 28 has been continuously increased in steps of T during the operation of the converter. At a later numerical value, also shown in FIG. 3, the period of time t12 is already 3T and the period of time t22 only 5T. Since the ratio between the widths of the pulses 28, 29 (width modulation of the pulses) has been continuously changed, the mean value of the energy supplied to the load 4 also changed. The result is that the amplitude of the output signal 31 is changed. The mean value rises in this case.

Strictly speaking, the amplitude of the resultant signal 31 changes step by step, the steps of such a staircase being designated by S in FIG. 4. The length of one step S is given by the total length of the periods of time t1 and t2 of the successive pulse pairs 28, 29 in which the ratio of their widths t1 and t2 remained unchanged.

The change in amplitude of the output signal 31 can be gradual, as is the case according to FIG. 3, or this change can occur relatively rapidly. In FIG. 4, a case is shown as an example in which the ratio between the periods of time t1 and t2 is changed relatively rapidly and, at the same time, in such a manner that a resultant signal 31 with increasing and decreasing amplitude is produced. By suitable control, for example of the switches 11 and 12, steps S can be achieved the height and length of which make it possible to approximate virtually any arbitrary second alternating current signal 32, in particular the sine curve shown in FIG. 4.

In the case of curves 32 with rapidly changing amplitude, the computer 5 would have to operate very quickly. This is because it would have to supply during the period of one pulse pair 28, 29, taking into consideration the data influencing its operating mode, the control signals, adapted in each case, for the period of time of the next pulse pair 28, 29 to the switches 11 to 16. Since this would make very high demands on the computing speed of the computer 5, the signals required for controlling the switches 11 to 16 are only calculated in time intervals A (FIG. 4) which are greater than the duration of one pulse pair, that is to say greater than t1 +t2. Between the times of two calculations, the switches 11 to 16 are controlled by means of sequences Q1, Q2, Q3 and so forth which are derived from patterns stored in the computer 5. During the respective calculation, the computer 5 selects from the stored patterns the one which is to be used as a basis for controlling the switches 11 to 16 up to the next calculation.

The time interval A between two calculations can even be longer than several steps S of the output signal 31 if the output signal 31 is changing rapidly. According to FIG. 4, the said time interval A comprises three steps S. Thus, the stored patterns are always calculated selected in anticipation of the next time interval A.

The patterns are stored, for example, in the form of tables in the memory of the computer 5. A large number of such pulse patterns or tables is stored in the memory of the computer 5. Starting from the preset values for the frequency and the amplitude of the output curve 32 and taking into consideration the measurement values determined in the converter, the computer 5 selects the stored pattern enabling a section of the output signal 31 approximating the desired curve 32 to a maximum extent in this area to be reached during the next time interval A. From the selected pattern, a control sequence is derived by the computer 5 which is used for controlling the switches 11 to 16. At the end of the respective control sequence, a further calculation is performed taking into consideration the instantaneous state of the converter and subsequently another pattern is selected if required, and so forth.

The frequency of the control signal 30 is selected to be higher than the frequency of the output signal 31 or 32 so that the output signal can be approximated at all.

Alternate closing of the switches 11 and 12 and so forth for the period t1 and t2 produces the signal 30 in which the width of the pulses 28 and 29 of this signal is modulated as required. This produces an apparent motor voltage Um=Uo(t1−t2). The switches 11 to 16 are set only at fixed intervals of, for example, 20 microseconds. The resultant quantization of the amplitude is continuously identified taken into consideration in later control sequences.

The present converter is also designed in such a manner that it can change its behavior depending on the load applied. A signal supplied to the computer 5 by the monitoring unit 26 informs it, for example, of the instantaneously occurring output current of the converter and thus on the loading of the load 4. If an increased loading occurs, patterns for control sequences Q1, Q2, Q3 and so forth are taken from the computer memory which lower the frequency of the output signal 31 and thus also, lower the speed of rotation of the motor 4. The feeding of the load 4 is interrupted with excessive loading. In detail, the program of the computer can be designed in such a manner that the overcurrent signal is evaluated as a percentage quantity. That is to say it is determined whether the overcurrent signal is present rarely, frequently or continuously. FIG. 5 relates to this design of the converter. As can be seen from FIG. 5, the turn-off time is changed in dependence on the percentage of the occurrence of the overload signal. The visual display 27 will be illuminated more or less intensely with various overloads and the frequency is lowered until the overload conditions are eliminated again. If an overload condition persists for a relatively long time, an overload turn-off operation is performed after a particular period which i$ determined by the percentage of occurrence of the overload signal. The turning-off can be set in various steps. Similar methods are also used for evaluating an over- or under-voltage in the sink circuit and with over-temperature of the electronic components.

The instantaneous value of the link circuit current measured in monitoring unit 26 can also be used, in particular, for calculating the load acting on the motor shaft. For this purpose, the respective measurement value is detected at the instant of the zero transition of the motor voltages 17 to 19 and evaluated. In addition, the magnetic field in the motor can be increased or decreased on the basis of statistic features of the measurement values such as maximum and minimum value. This makes it possible, for example, to lower the voltage and thus save energy when the motor is weakly loaded. Furthermore, electromechanical oscillation of the motor can be effectively counteracted by this means.

The program of the computer 5 contains two sections. The first section of the program is used for calculating frequency and amplitude of the output signal 32, taking into consideration preset values and conditions determined during the operation of the converter. For this purpose, the computer receives a setpoint signal for the frequency of the output signal 32 via an analog/digital converter. This frequency is changed in accordance with the setpoint in dependence on the selected settings for the acceleration and deceleration ramp time. Hysteresis in the frequency selection prevents the system from oscillating between discrete output frequencies. The frequency calculation is interrupted when both the forward and reverse control signals are switched off.

The converter can be adapted to applications occurring frequently such as, double frequency of the motor signals and so forth, with the aid of the option input or inputs.

The sinewave amplitude Uac of the output signal 32 is usually calculated in accordance with a linear law Uac=a.f+U1, where f is the frequency, a and U1 are constants. Both a and U1 are adjustable parameters. The calculation departs from the linear law in the range of low frequencies, depending on the options selected.

The second section of the computer program handles the patterns which are used as a basis for the control sequences.

I claim:

1. A process for converting a first alternating current signal into a second alternating current signal using a converter, in which switches are actuated by a computer based upon predetermined values and measurements made during the conversion, said process including the steps of:
    updating calculations of a desired frequency and amplitude or the second alternating current signal only at particular time intervals (A);
    producing control sequences from the updated calculations based upon at least one of said predetermined values and measurements made during the conversion; and
    controlling the switches based upon the control sequences for the duration of the time interval (A) between two consecutive calculations, said control sequences controlling the switches during the time intervals (A) so as to produce the second alternating current signal.

2. Process as claimed in claim 1 wherein the first alternating-current signal is taken from a single-phase or multi-phase power system and a three-phase alternating-current signal is formed from this signal.

3. A process as claimed in claim 1, which is used for controlling an asynchronous motor, wherein the choice of the direction of rotation of the motor and the definition of the acceleration time of the motor from standstill up to the set rotational speed are used as preset values.

4. A converter for performing the process as claimed in claim 1, which contains a rectifier and an inverter, wherein the inverter contains switches which can be controlled by means of a control device.

5. A converter as claimed in claim 4, wherein the control device includes a computer, the inputs of which are connected to actuating elements and to receivers of instantaneous values in the converter, and wherein the computer calculates the required frequency and amplitude of the second alternating current signal on the basis of the preset values and the instantaneous values, and the outputs of the computer are connected to the switches.

6. A process as in claim 1, wherein the control sequences are derived from pulse-shaped patterns which are stored in the form of tables in the computers.

7. A process as in claim 6, wherein an element (S) of a control sequences is formed by an at least one pair of pulses, each of the pulses in the pair having opposite polarity, and wherein the length of width (t1 or t2) of each of the pulses is varied to obtain the required amplitude of the second alternating current signal at a given instant.

8. A process as in claim 7, wherein the width of the pulses represents an integer multiple of a basic interval (T).

9. A process as in claim 1, wherein the process is used to control a motor, and wherein said at least one of said measurements is the instantaneous value of a current determined at a monitoring unit, which is used for calculating a load moment and for regulation of the effective magnetic field in the motor.

10. A process as in claim 7 wherein the time intervals (A) are greater than the length of width (t1 or t2) of the pulse pair, and wherein the computer selects one of the stored pulse patterns during the respective calculations to control the switches until the next calculation is updated.

11. A process as in claim 7, wherein the time interval (A) between consecutive updated calculations is longer than one element (S).

12. A process as in claim 7, wherein the frequency of a control signal is chosen to be higher than the frequency of the second alternating current signal.

13. A process as in claim 6, wherein the process is used to control a motor, and a signal fed from a monitoring unit to the computer informs the computer of the instantaneous output current of the converter and thus of the load on the motor, and wherein the converter changes its behavior depending on the load.

14. A process as in claim 13, further including the step of determining a percentage appearance of an overcurrent signal, and changing a turn-off time depending on the percentage appearance of the overcurrent signal.

15. A process as in claim 14, wherein the turn off is adjusted incrementally.

16. A process as in claim 13, further including the step of determining an over- or under-voltage at the monitoring unit and performing a switch-off when the over- or under-voltage reach a predetermined level.

17. A process as in claim 6, wherein the width of the pulses in the pulse-shaped patterns represents an integral multiple of one basic interval (T).

18. A process as in claim 6, wherein the process is used to control a motor, and wherein the instantaneous value of a current determined at a monitoring unit is used for calculating the load acting on the motor shaft, and wherein the current is measured when the respective motor voltages pass through zero.

19. A process as in claim 6, wherein the process is used to control a motor, and wherein the magnetic field of the motor is changed based on said measurements so as to conserve energy when said motor is in a low-load state.

* * * * *